United States Patent [19]

Yanagisawa

[11] Patent Number: 5,249,656
[45] Date of Patent: Oct. 5, 1993

[54] CLUTCH

[76] Inventor: Ken Yanagisawa, c/o, Kabushiki Kaisha Mechnaic Sekkei Jimusho, 5175-1, Ooaza Toyoshina, Toyoshina-machi, Minamiazumi-gun, Nagano-ken, Japan

[21] Appl. No.: 899,934

[22] Filed: Jun. 17, 1992

Related U.S. Application Data

[63] Continuation of Ser. No. 745,330, Aug. 15, 1991, abandoned.

[51] Int. Cl.⁵ .................. F16D 67/04; F16D 13/30
[52] U.S. Cl. .................. 192/18 A; 192/48.9; 192/66; 192/87.17; 192/91 A
[58] Field of Search .............. 192/48.8, 19 A, 18 a, 192/87.17, 66, 48.9

[56] References Cited

U.S. PATENT DOCUMENTS

| | | | |
|---|---|---|---|
| 228,046 | 5/1880 | Doane | 192/48.8 |
| 2,055,970 | 9/1936 | Fippard | 192/87.17 |
| 2,175,382 | 10/1939 | Eason | 192/66 X |
| 2,462,657 | 2/1949 | McNairy | 192/18 A |
| 3,024,885 | 3/1962 | Dence et al. | 192/87.17 X |
| 3,076,305 | 2/1963 | Meisser | 192/66 X |
| 3,164,036 | 1/1965 | Lamburn et al. | 192/18 A X |
| 3,324,981 | 6/1967 | Aschauer | 192/87.17 X |
| 3,362,511 | 1/1968 | Aschauer | 192/87.17 X |
| 3,618,425 | 11/1971 | Wickman | 192/18 A X |
| 4,706,520 | 11/1987 | Sivalingam | 192/18 A X |
| 4,763,765 | 8/1988 | Black | 192/87.17 X |
| 4,939,946 | 7/1990 | Teramachi | 74/89.15 |

*Primary Examiner*—Rodney H. Bonck

[57] ABSTRACT

An inexpensive and small size clutch transmits variable torque. The clutch comprises a rotary shaft; a rotor coaxial to the rotary shaft; a clutch member provided for the rotor, the clutch member reversibly switching the rotor from an engaged state to a free state with respect to the rotary shaft; a biasing member for biasing the clutch member so as to cause the rotor to be in the engaged state; and a movable body being movable in the axial direction of the rotary shaft. The movable body presses the clutch member against the biasing force of the biasing member so as to cause the rotor to be in the free state when the movable body is moved by a driving device. Thus, if there are a plurality of rotors, they can be rotated by one motor. The rotor can be made free with respect to the rotary shaft by moving the movable body.

19 Claims, 4 Drawing Sheets

CLUTCH

This application is a continuation, of application Ser. No. 07/745,330 filed on Aug. 15, 1991, now abandoned.

BACKGROUND OF THE INVENTION

The present invention relates to a clutch, and more precisely, the invention relates to an inexpensive and a small size clutch for transmitting variable torque.

Conventionally, there have been mechanisms for selectively rotating a plurality of driven bodies such as rotatable shafts and rotors. Some mechanisms have, for example, motors respectively connected to each driven body. The motors are selectively turned on and off so as to selectively rotate the driven bodies.

However, the above described mechanisms have the disadvantages of being large in size and uneconomical because of the plurality of motors and the resultant increased manufacturing cost.

SUMMARY OF THE INVENTION

An object of the present invention is to provide an inexpensive and a small size clutch for transmitting variable torque.

To achieve the object, the present invention has the following structure:

A clutch of the present invention comprises a rotary shaft; a rotor coaxial to the rotary shaft; a clutch member provided to the rotor, the clutch member switching the rotor from an engaged state to a free state with respect to the rotary shaft; biasing means for biasing the clutch member so as to cause the rotor to be in the engaged state; and a movable body being movable in the axial direction of the rotary shaft, the movable body pressing the clutch member against the biasing force of the biasing means so as to cause the rotor to be in the free state when the movable body is moved by driving means.

Thus, if there are a plurality of rotors, they can be rotated by one motor. The rotor can be made free with respect to the rotary shaft by moving the movable body.

In the present invention, one motor is capable of selectively driving a plurality of driven bodies, so that the clutch, including a motor, can be compact and light weight. Furthermore, the manufacturing cost of the clutch will be decreased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be apparent form the following description, reference being had to the accompanying drawings wherein preferred embodiments of the present invention are clearly shown.

The drawings are given by way of illustration only, and thus are not limitative of the preferred invention.

In the drawings:

FIG. 1 is a front sectional view of first embodiment of the clutch of the present invention;

FIG. 2 is a right side view thereof, with portions broken away for clarity;

FIG. 3 is a front view showing one example of a device using the clutch;

FIG. 4 is a front sectional view of second embodiment;

FIG. 5 is a front sectional view of third embodiment; and

FIG. 6 is a side view of another example of the clutch member.

DETAILED DESCRIPTION OF PREFERRED EMBODIMENTS

Preferred embodiments of the present invention will now be described in detail with reference to accompanying drawings.

FIRST EMBODIMENT

A first embodiment will be explained with reference to FIGS. 1 and 2.

Figure 1:
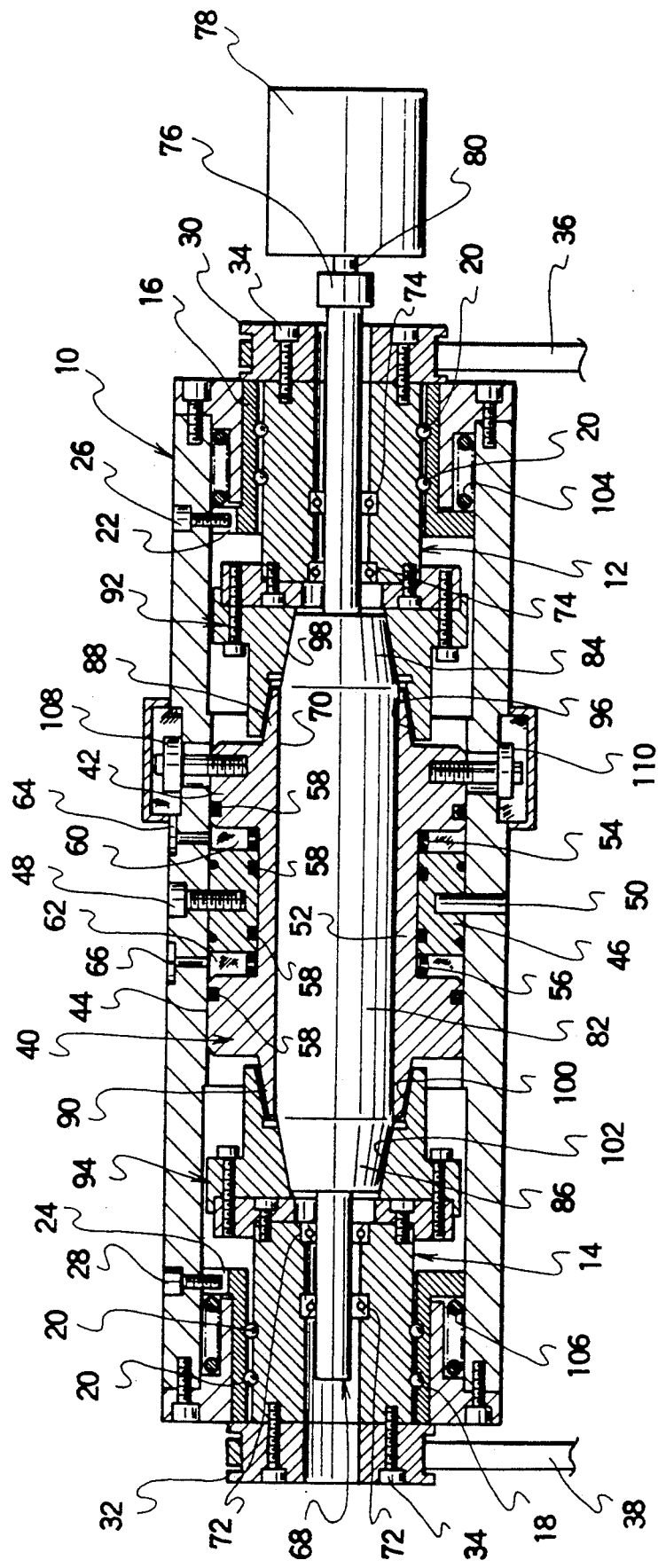

In FIG. 1, a clutch proper 10 is formed into a hollow cylinder with both ends open.

In FIG. 1, a clutch proper 10 is formed into a hollow clutch proper 10. The rotors 12 and 14 are provided in outer ring sections 16 and 18 with balls 20, so that there are formed bearing surfaces in which rotation of the rotors 12 and 14 within the outer ring sections 16 and 18 is possible but axial movement independent of the outer ring sections 16 and 18 not possible. Note that, the outer ring sections 16 and 18 have slots 22 and 24 respectively in their flange sections, and the threaded ends of bolts 26 and 28, which are screwed into the clutch proper 10, are always in the slots 22 and 24. With this structure, the outer ring sections 16 and 18 are capable of moving in the axial direction (in the drawing, the right-left direction) of the clutch proper 10 but rotation about the axis thereof is prevented.

Pulleys 30 and 32 are respectively fixed to the rotors 12 and 14 by bolts 34. There are engaged belts 36 and 38 about the pulleys 30 and 32. The belts 36 and 38 respectively connect the pulleys 30 and 32 to driven members (not shown) so as to transmit the torque of the rotors 12 and 14 thereto.

A movable body 40 is provided in the clutch proper 10. Both end sections of the movable body 40 are formed into large diameter sections 42 and 44, whereas the center section 52 therebetween has a respectively lesser diameter. A sleeve 46 is fixed about the center section 52 of the clutch proper 10 by a bolt 48 and a pin 50. The movable body 40 is capable of axial movement through the clutch proper 10 with the center section 52 moving through a center hole of the sleeve 46.

Coil springs 54 and 56 are provided between each inner end face of the large diameter sections 42 and 44 and each end face of the sleeve 46. The elastic forces of springs 54 and 56 are equal, so that the position of the sleeve 46 will be centered between the large diameter sections 42 and 44 (the neutral position) when no externally generated forces act upon the movable body 40.

O-rings 58 are provided between the outer circumferential faces of the large diameter sections 42 and 44 and the inner face of the clutch proper 10, and between the outer circumferential face of the small diameter section 52 and the inner face of the center hole of the sleeve 46. Thus, there are formed air chambers 60 and 62 sealed by said O-rings 58 in the clutch proper 10. In the clutch proper 10, there are bored through-holes 64 and 66 as airports, which correspond to the air chambers 60 and 62. Tubes (not shown) for introducing and exhausting compressed air, which is an example of driving means, are connected to the through-holes 64 and 66. With this structure, introduction of compressed air into the air chambers 60 and 62 results in axial movement of the movable body 40 toward the air chamber 60 or 62 into which the compressed air is introduced.

A rotary shaft 68 is loosely inserted through the clutch proper 10 and a center hole 70 of the movable body 40. The left end section of the rotary shaft 68 is connected to the rotor 14 via bearings 72, so that the rotor 14 is capable of rotation about the rotary shaft 68; the rotor 12 is connected to the rotary shaft 68 via bearings 74, so that the rotor 12 is capable of rotation thereon. The right end of the rotary shaft 68 is connected to an output shaft 80 of a motor 78 by a coupler 76, such that the torque of the motor 78 is directly transmitted to the rotary shaft 68. The mid section of the rotary shaft 68 is formed into a large diameter section 82. Both ends of the large diameter section 82 are formed into male-tapered sections 84 and 86. Both ends of the movable body are also formed into male-tapered sections 88 and 90. Note that the rotary shaft 68 cannot move in the axial direction of the clutch proper 10.

Clutch members 92 and 94 are respectively fixed to the inner end faces of the rotors 12 and 14. The clutch member 92 is formed into a hollow cylindrical shape, and has a female-tapered section 96 which corresponds to the male-tapered section 88 of the movable body 40, and a female-tapered section 98 corresponding to the male-tapered section 84 of the large diameter section 82 of the rotary shaft 68. The female-tapered sections 96 and 98 are coaxial to each other and to the clutch member 92. The clutch member 94 is also formed into a hollow cylindrical shape, and has a female-tapered section 100 which corresponds to the male-tapered section 90 of the movable body 40, and a female-tapered section 102 corresponding to the male-tapered section 86 of the large diameter section 82 of the rotary shaft 68. The female-tapered sections 100 and 102 are coaxial to each other and to the clutch member 94.

Coil springs 104 and 106, which are an example of a biasing means, encircle the outer circumferential faces of the outer ring sections 16 and 18 respectively. The coil springs 104 and 106 are provided under compression between the clutch proper 10 and radially extending flanges of the outer ring sections 16 and 18. Thus, the coil springs 104 and 106 always bias the outer ring sections 16 and 18, the clutch members 92 and 94 and the rotors 12 and 14 towards the axial center of the clutch proper 10. When no externally generated force works upon the clutch members 92 and 94 (i.e. the normal condition), and the clutch members 92 and 94 are biased inwards, the male-tapered sections 84 and 86 of the large diameter section 82 of the rotary shaft 68 are tightly engaged with the female-tapered sections 98 and 102. Thus, the clutch members 92 and 94 and the rotary shaft 68 are mutually connected by the frictional force between the male-tapered sections 84 and 86 and the female-tapered sections 98 and 102. In this state (shown in FIG. 1), the rotors 12 and 14 are in an engaged state with respect to the rotary shaft 68.

On the other hand, when the clutch members 92 and 94 are pressed outward against the force of the coil springs 104 and 106, the male-tapered sections 84 and 86 are disconnected from the female-tapered sections 98 and 102, so that the clutch members 92 and 94 are free from the rotary shaft 68. In this state, the rotors 12 and 14 are in a free state with respect to the rotary shaft 68.

To disengage the clutch member 92 or 94, compressed air is introduced into the air chamber 60 or 62 via the through-hole 64 or 66 to move the movable body 40 rightward or leftward against the force of the coil spring 56 or 54. The male-tapered section 88 or 90 of the movable body 40 tightly fits into the female-tapered section 96 or 100 of the clutch member 92 or 94, so that the frictional force between the fitted sections brakes and stops the rotation of the clutch member 92 or 94 and the rotor 12 or 14. Furthermore, the clutch member 92 or 94 and the rotor 12 or 14 are further pressed outward against the force of the coil spring 104 or 106 such that the male-tapered section 84 or 86 of the large diameter section 82 of the rotary shaft 68 is disengaged from the female-tapered section 98 or 102 of the clutch member 92 or 94, resulting in movement of the clutch 92 or 94 and the rotor 12 or 14 into the free state.

To cause the rotor 12 or 14 to return to the engaged state from the free state, introduction of the compressed air into the air chamber 60 or 62 is halted, allowing the movable body 40 to return to the neutral position by the force of the coil spring 54 or 56. At that time, the rotor 12 or 14, which has been pressed outward by the movable body 40, returns to an axially centered position (shown as FIG. 1), so that the male-tapered section 84 or 86 fits into the female-tapered section 98 or 102, and the male-tapered section 88 or 90 disconnects from the female-tapered section 96 or 100.

When the rotors 12 and 14 are switched to the free state, as described above, the rotation of the clutch members 92 and 94 is first braked and stopped, then the clutch members 92 and 94 are freed, so that unexpected rotation of the rotors 12 and 14 caused by external forces working on the driven members can be prevented. There is a slight time lag between this braking and the actual disengagement, but movement of the movable body 40 out of contact with the clutch member will cause an instantaneous change from the free state to the engaged state. On the other hand, when the rotors 12 and 14 are switched to the engaged state, the clutch member 92 or 94 is first connected to the rotary shaft 68, and only after said engagement is capable of rotation. Movement of the movable body 40 into contact with the clutch member causes an instantaneous change from the engaged state to the free state.

Figure 2:
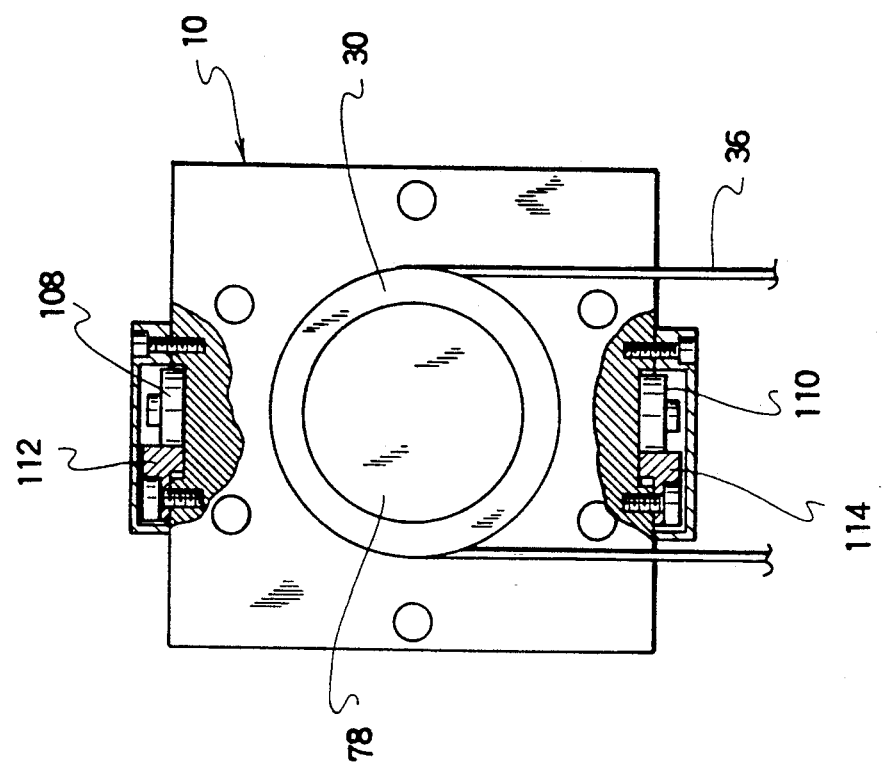

Note that, in FIG. 2, there are provided cam-followers 108 and 110 to the movable body 40, which are an example of means for preventing the rotation of the movable body 40 within the clutch proper 10. The cam-followers 108 and 110 have eccentric rollers, so that they always contact stoppers 112 and 114 which are provided to the clutch proper 10. The positions of the stoppers 112 and 114 can be adjusted circumferentially about the axis, so that the stoppers 112 and 114 can be moved to a position where the cam-followers 108 and 110 always contact them. This contact prevents rotation of the movable body 40 relative to the clutch proper 10.

In the present embodiment, the movable body 40 is driven by compressed air but the movable body 40 may be driven by, for example, an air cylinder unit which can be provided on the outer face of the clutch proper 10 and which engages the cam-followers 108 and 110.

Furthermore, in the present embodiment, there are two rotors 12 and 14 in the clutch proper 10 but there may be provided three or more rotors therein. In this case, three or more driven members can be driven.

Figure 3:
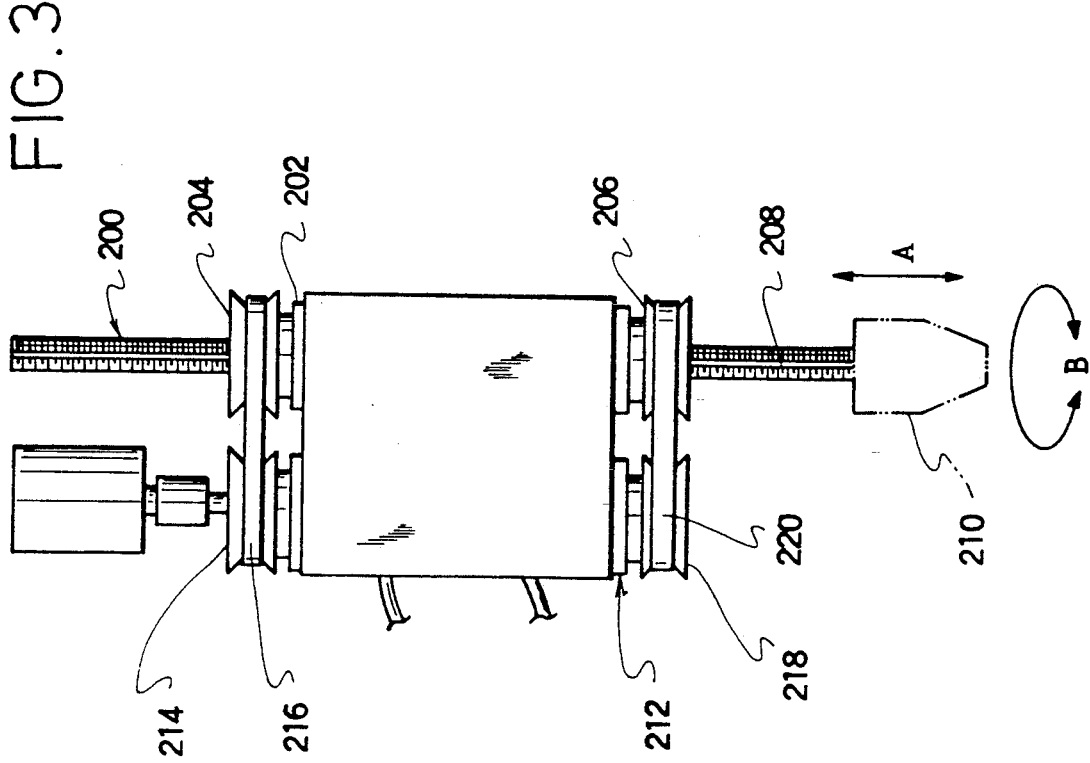

Next, a device using the clutch will be explained with reference to FIG. 3. This device has a ball bearing screw 200 with spline grooves, to which tools, etc. are attached for their complex movement (see U.S. Pat. No. 4,939,946; Title: Composite motion guide device; Application date: Jul. 10, 1990; Inventor: H. TERAMACHI.) If a pulley 204 of a ball bearing screw unit 202 is rotated, the ball bearing screw 200 moves upward or downward (an arrow A); if a pulley 206 is rotated, a rotating section (not shown), which is engaged with the spline grooves 208, rotates and the ball bearing screw 200 rotates (an arrow B). Therefore, the up-down movement and the rotation of the ball bearing screw 200 are capable of the complex movement required of a tool 210.

The pulleys 204 and 206 are capable of rotating independently by using the clutch 212 of the present invention. A pulley 214 of the clutch 212 and the pulley 204 of the ball bearing screw unit 202 are mutually connected by a belt 216; a pulley 218 of the clutch 212 and the pulley 206 of the ball bearing screw unit 202 are mutually connected by a belt 220. Thus, the pulleys 204 and 206 can be rotated selectively or simultaneously by the clutch 212, so that the complex movement of the tool 210 can be controlled.

SECOND EMBODIMENT

Figure 4:
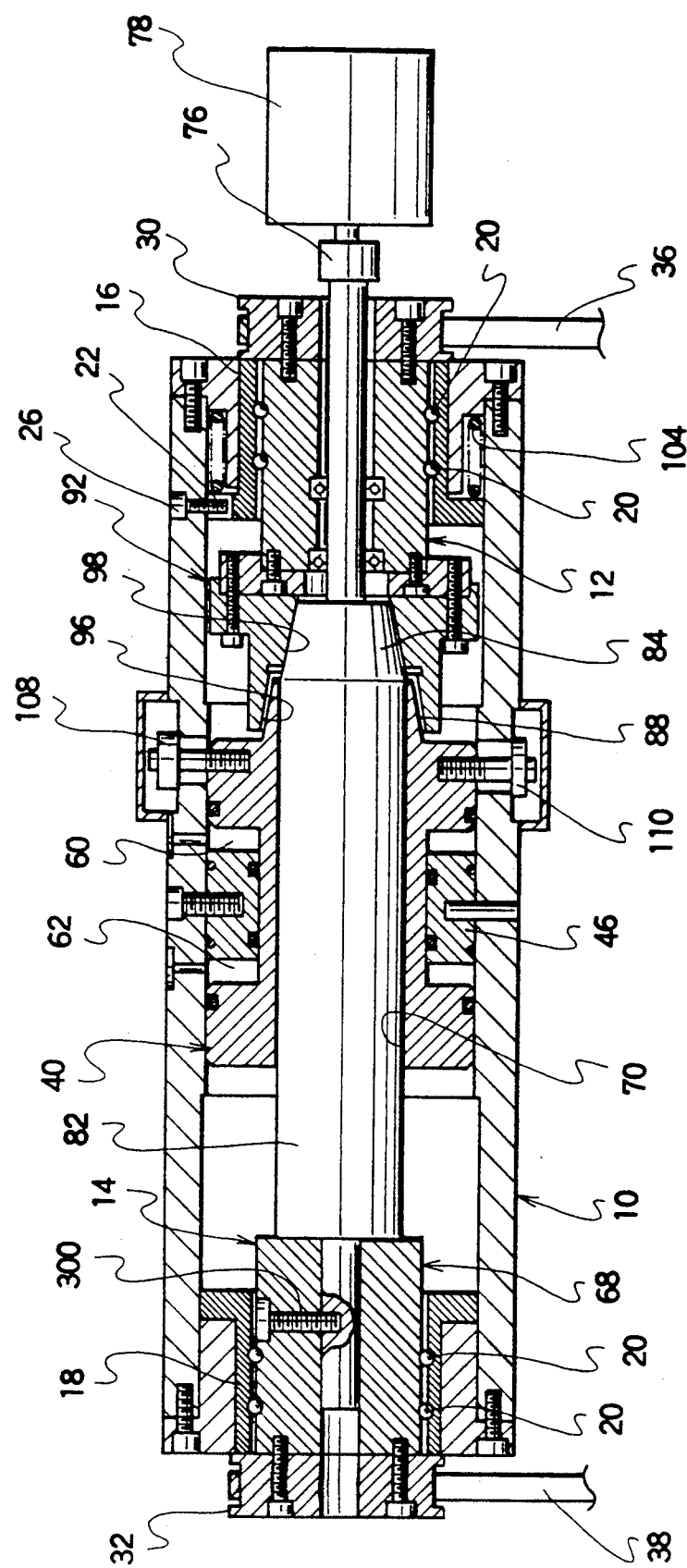

A second embodiment will be explained with reference to FIG. 4. Note that, elements which are the same as in the first embodiment will be assigned the same symbols used therein, and explanation therefor will be omitted.

Whereas the rotary shaft 68 is inserted through the rotors 12 and 14 in the first embodiment, in the Second Embodiment, the rotor 14 is fixed to the rotary shaft 68 by a bolt 300, so that the rotor 14 consists of a part of the rotary shaft 68. Namely, the rotor 14 is always connected to the motor 78, and the rotor 14 transmits rotation to the rotary shaft 68 when the motor 78 rotates.

The rest of structure is essentially the same as that of the first embodiment. When the compressed air is introduced into the air chamber 60 so as to move the movable body 40 rightwards from the position shown in FIG. 4, the clutch member 92 and the rotor 12 are moved rightwards, so that rotor 12 is switched from the engaged state to the free state. Therefore, the clutch of the present embodiment is capable of switching the status of the one rotor 12.

Note that, in the present embodiment, the movable body 40 is returned to the neutral position by introducing compressed air into the air chamber 62. However, the movable body 40 may be returned to the neutral position by the coil springs 54 and 56 (see FIG. 1) instead of compressed air.

THIRD EMBODIMENT

Figure 5:
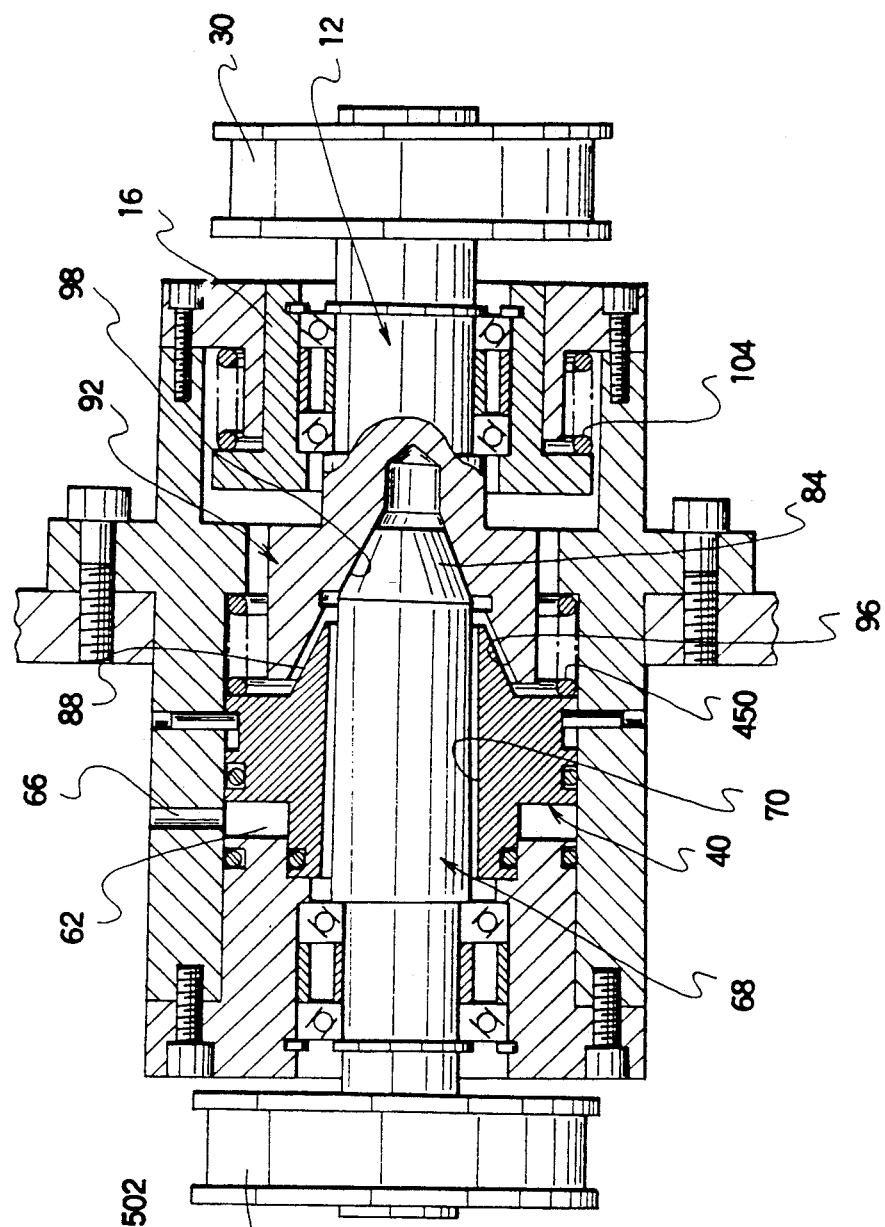

A third embodiment will be explained with reference to FIG. 5. Note that, elements which are the same as those in preceding embodiments will be assigned the same symbols used therein, and explanation will be omitted.

The clutch of the present embodiment has not only a clutch function but also a brake function.

First, the clutch function will be explained. In a normal condition, as shown in FIG. 5, torque is inputted to one of the pulleys 30 or 32, and the pulley 30 or 32 rotates. The outer ring section 16, the rotor 12 and the clutch member 92 are biased leftward by the coil spring 104. The movable body 40 is also biased leftward by a coil spring 450. Therefore, the male-tapered section 84 of the rotary shaft 68 fits into the female-tapered section 98 of the clutch member 92, so that the torque of the pulley 30 or 32 is transmitted to the other pulley 32 or 30 via said interface between the rotary shaft 68 and the clutch member 92, causing rotation of the other pulley 32 or 30.

If compressed air is introduced into the air chamber 62 via the through-hole 66 while the pulleys 30 and 32 are rotating, the movable body 40 is pressed rightward against the force of the coil spring 450, and the male-tapered section 88 fits into the female-tapered section 96 of the clutch member 92. As the result of said engagement, the male-tapered section 84 of the rotary shaft 68 is disconnected from the female-tapered section 98 of the clutch member 92, and the rotation of pulley 30 is halted. If pulley 32 is the driving member, it will continue to rotate. With this structure, the clutch member 92 is braked until it is disengaged, so that a safe interlock mechanism is provided.

Next, the brake function will be explained. In a normal condition, as shown in FIG. 5, torque is transmitted to the pulley 30, causing said pulley to rotate. The outer ring section 16, the rotor 12 and the clutch member 92 are biased leftward by the coil spring 104. The movable body 40 is also biased leftward by a coil spring 450. Therefore, the male-tapered section 88 of the movable body 40 is not engaged in the female-tapered section 96 of the clutch member 92, and the pulleys rotate freely.

If compressed air is introduced into the air chamber 62 via the through-hole 66 while the pulley 30 is rotating, the movable body 40 is pressed rightward against the force of the coil spring 450, and the male-tapered section 88 fits into the female-tapered section 96 of the clutch member 92. As the result of said engagement, the rotation of clutch member 92 is braked and then the male-tapered section 84 of the rotary shaft 68 is disconnected from the female-tapered section 98 of the clutch member 92, completely stopping the rotation of pulley 30.

Figure 6:
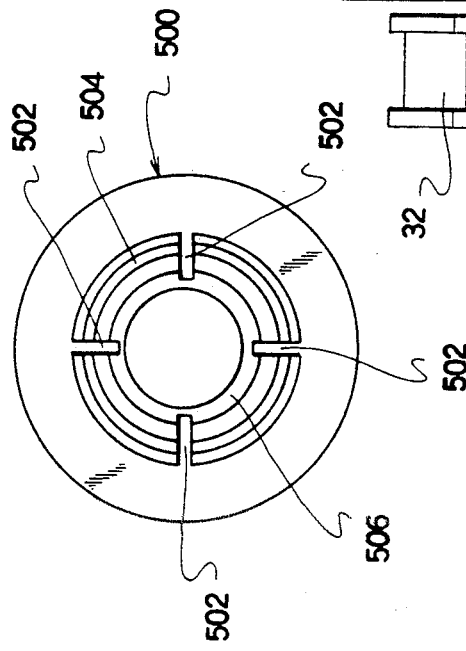

Next, another example of the clutch member will be explained with reference to FIG. 6. The clutch member 500 has four slots 502, which extend radially at regular intervals, and which are formed in the axial direction thereof. The depth of slots 502 is such that their bottom faces intersect the mid section of the face of a second female-tapered section 506. By forming the slots 502, the clutch member 500 can elastically deform. The advantageous result is that the male-tapered sections of the movable body and the rotary shaft are capable of tightly fitting into the female-tapered sections 504 and 506, even if the axes of the male-tapered sections deviate slightly from the axes of the female-tapered sections 504 and 506. Hence, a lesser degree of precision is required during manufacturing and assembly, with resultant cost benefits.

The invention may be embodied in other specific forms without departing from the spirit or essential characteristics thereof. The present embodiments are therefore to be considered the scope of the invention being indicated by the appended claims rather than by the foregoing description and all changes which come within the meaning and range of equivalency of the claims are therefore intended to be embraced therein.

What is claimed is:

1. A variable torque transmitting cone type clutch, comprising:
   a clutch housing;
   a rotary shaft;
   a rotor coaxial to said rotary shaft;
   a clutch member affixed to said rotor, said clutch member reversibly switching said rotor from an engaged state to a free state with respect to said rotary shaft;
   biasing means for biasing said clutch member so as to cause said rotor to be in the engaged state, said biasing means being elastically provided between said clutch housing and said rotor; and
   a movable body being movable in the axial direction of said rotary shaft, said movable body pressing said clutch member against the biasing force of said biasing means so as to cause said rotor to be in the free state when said movable body is moved by driving means,
   whereby movement of the movable body into contact with the clutch member causes an instantaneous change from the engaged state to the free state.

2. The clutch according to claim 1, wherein said clutch member has a hollow cylindrical shape and in which there is a first female-tapered section on the inner face thereof and wherein said rotary shaft has a first male-tapered section on the outer circumferential face thereby, wherein the first male-tapered section is capable of fitting into the first female-tapered section when said rotor is in the engaged state.

3. The clutch according to claim 2, wherein said rotary shaft has a large diameter section, and the first male-tapered section is at one end of the large diameter section, which is on a side of said clutch member.

4. The clutch according to claim 1, wherein:
   said clutch member has a hollow cylindrical shape and in which there is a first female-tapered section and a second female-tapered section on the inner face thereof; and
   said movable body has a hollow cylindrical shape, said movable body covers said rotary shaft, a first male-tapered section and a second male-tapered section are formed on the outer circumferential face of said movable body, wherein the second male-tapered section is capable of fitting into the second female-tapered section when said rotor is in the free state.

5. The clutch according to claim 1, wherein:
   said clutch member has a hollow cylindrical shape in which there is a first female-tapered section and a second female-tapered section in the axial direction on the inner face thereof;
   said rotary shaft has a first male-tapered section on the outer circumferential face thereof, wherein the first male-tapered section is capable of fitting into the first female-tapered section when said rotor is in the engaged state; and
   said movable body has a hollow cylindrical shape, said movable body covers said rotary shaft, a second male-tapered section is on the outer circumferential face of said movable body, wherein the second male-tapered section is capable of fitting into the second female-tapered section when said rotor is in the free state.

6. The clutch according to claim 5, wherein said rotary shaft has a large diameter section, and the first male-tapered section is at one end section, which is on said clutch member side, of the large diameter section.

7. The clutch according to claim 1, further comprising a pulley for inputting rotary torque to said rotor.

8. The clutch according to claim 1, further comprising a pulley for outputting rotary torque from said rotor.

9. The clutch according to claim 1, further comprising a pulley for inputting rotary torque to said rotary shaft.

10. The clutch according to claim 1, further comprising a pulley for outputting rotary torque from said rotary shaft.

11. The clutch according to claim 1, wherein said driving means is compressed air.

12. The clutch according to claim 1, wherein said biasing means is a coil spring.

13. The clutch according to claim 1, further comprising a couple of rotors;
    said movable body is usually positioned in a neutral position in which no clutch member is engaged thereby; and
    said rotors are selectively switched to the free state by said driving means.

14. The clutch according to claim 1, further comprising a plurality of cam followers provided on said movable body, said cam followers preventing rotation of said movable body relative to said clutch housing.

15. The clutch according to claim 1, wherein the movable body and the clutch member are arranged so that movement of the movable body out of contact with the clutch member causes an instantaneous change from the free state to the engaged state.

16. A variable torque transmitting cone type clutch, comprising:
    a clutch housing;
    a rotary shaft;
    a rotor coaxial to said rotary shaft;
    a clutch member affixed to said rotor, said clutch member reversibly switching said rotor from an engaged state to a free state with respect to said rotary shaft, said clutch member has a hollow cylindrical shape in which there is a first female-tapered section and a second female-tapered section on the inner face thereof;
    biasing means for biasing said clutch member so as to cause said rotor to be in the engaged state; and
    a movable body being movable in the axial direction of said rotary shaft, said movable body pressing said clutch member against the biasing force of said biasing means so as to cause said rotor to be in the free state when said movable body is moved by driving means, whereby movement of the movable body into contact with the clutch member causes an instantaneous change from the engaged state to the free state, said movable body has a hollow cylindrical shape, said movable body covers said rotary shaft, a first male-tapered section and a second male-tapered section are formed on the outer circumferential face of said movable body, wherein the second male-tapered section is capable of fitting into the second female-tapered section when said rotor is in the free state.

17. The clutch according to claim 16, wherein said rotary shaft has a first male-tapered section on the outer circumferential face thereof, wherein the first male-tapered section of the shaft is capable of fitting into the first female-tapered section when said rotor is in the engaged state.

18. The clutch according to claim 17, wherein said rotary shaft has a large diameter section, and the first male-tapered section of the rotary shaft is at one end section, which is on said clutch member side, of the large diameter section.

19. A variable torque transmitting cone type clutch, comprising:
- a clutch housing;
- a rotary shaft;
- a couple of rotors coaxial to said rotary shaft;
- a clutch member affixed to said rotors said clutch member reversibly switching said rotors from an engaged state to a free state with respect to said rotary shaft;
- biasing means for biasing said clutch member so as to cause said rotors to be in the engaged state; and
- a movable body being movable in the axial direction of said rotary shaft, said movable body pressing said clutch member against the biasing force of said biasing means so as to cause said rotors to be in the free state when said movable body is moved by driving means, whereby movement of the movable body into contact with the clutch member causes an instantaneous change from the engaged state to the free state, said movable body being usually positioned in a neutral position in which no clutch member is engaged thereby, and said rotors being selectively switched to the free state by said driving means.

* * * * *